Aug. 12, 1930.                M. LAPHAM                1,772,582
                              TRACK BOLT
                           Filed June 14, 1928

INVENTOR
Marshall Lapham
BY J. Wm Ellis
ATTORNEY

Patented Aug. 12, 1930

1,772,582

UNITED STATES PATENT OFFICE

MARSHALL LAPHAM, OF NEW YORK, N. Y., ASSIGNOR TO SPIRAL-ROLLED PRODUCTS CO., INC., OF NEW YORK, N. Y., A CORPORATION OF NEW YORK

TRACK BOLT

Application filed June 14, 1928. Serial No. 285,428.

My invention relates in general to bolts, specifically those used in joining together sections of rails, and particularly to locking means for such bolts.

As is well known to those skilled in the art, the life of the present track bolt is shortened in service, due to the following reasons:

First, the failure of the threads to the extent that the bolt will not remain tight, due to abrasion by the lock nut and the angle bar; second, the corrosion of the exposed parts of the bolt so that it is necessary to destroy the bolt in order to remove the same; third, the excessive wear in the holes of the splice bar which allows the bolt shank to turn in the hole, whereby the bolt and the nut in a short time become loose, and constant vibration of the loose parts wears the threads to such an extent that it is impossible to tighten the nut and make it hold.

In overcoming the above mentioned disadvantages, it has been an object of my invention to provide a bolt having a washer which shall prevent the rotation of the bolt and which also shall prevent the abrasion of the threads of the bolt.

Another object has been to provide a bolt so formed that the nut, when tightly drawn up, may be locked in position.

Furthermore, it has been an object to increase the resistance of the head of the track bolt to corrosion without increasing the amount of metal in the bolt, by utilizing the oval shoulder ordinarily formed under the heads of track bolts, which metal may be forged into the head of my improved bolt.

The above objects and advantages have been accomplished by the device shown in the drawings, of which:

Figure 1:
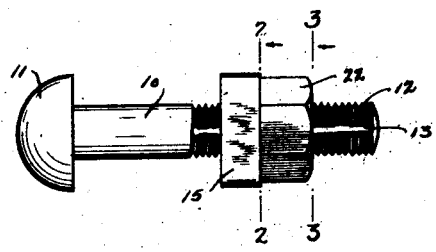
Fig. 1 is a side elevation of my complete bolt with its washer and nut.

The bolt comprises a body 10 which has a head 11, preferably hemispherical, or of any other suitable shape. Since in my bolt the usual oval shoulders under the head are omitted, the metal ordinarily formed in such shoulder may be utilized in the head 11 to increase its size, and thereby increase its resistance to corrosion. If desired, however, the head 11 may be made of the usual size, and, since the oval shoulders are omitted, the bolt will be considerably lighter in weight while at the same time maintaining the same strength. The bolt is provided at its outer end with a threaded portion 12 which extends back upon the bolt to any suitable or desired distance. The threaded end of the bolt is provided with a plurality of longitudinal grooves 13. As shown in the drawings, these grooves may be semi-circular in shape and two of them are used. Obviously, more grooves may be utilized if desired. The grooves may in some cases extend along the unthreaded part of the body or even as far as the head where conditions make it desirable.

Figure 2:
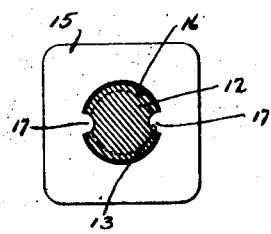
Fig. 2 is an enlarged, transverse, sectional view taken on line 2—2 of Fig. 1.

The washer of my device is shown at 15 and this is provided with an opening 16, the diameter of which is slightly larger than the outside diameter of the threaded portion 12 of the bolt. Two tabs 17 are formed in the washer and extend into the bore thereof. The tabs are of the same shape as the grooves 13 formed in the bolt, and they engage these grooves. The proportions of the grooves and tabs are such that the tabs will ride in the grooves and keep the circular bore 16 of the washer out of contact with the threads of the bolt, thereby preventing the usual wear on the threads as the result of vibration. The washer 15 is preferably rectangularly shaped as shown in Fig. 2 and is so proportioned that it fits in between the flanges 20 of the customary angle bar 21, thereby preventing the washer 15, and hence the bolt, from relative rotation with the angle bar. Arranged behind the washer and disposed on the threaded portion 12 of the bolt is a nut 22 of standard form.

Figure 3:
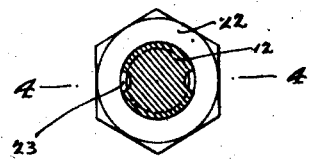
Fig. 3 is an enlarged, transverse, sectional view taken on line 3—3 of Fig. 1 showing the method of locking the nut.
Figure 5:
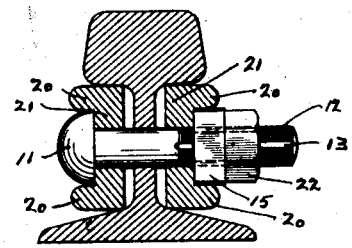
Fig. 5 shows a reduced transverse sectional view of a rail and splice bars with my bolt in position.
Figure 4:
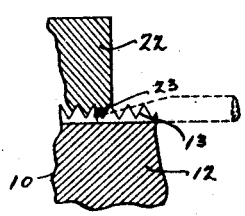
Fig. 4 is an enlarged, fragmentary, sectional view taken on line 4—4 of Fig. 3.

It will be seen from the foregoing that when my bolt is being used, the parts are assembled as shown in Fig. 5 with the bolt passing through the rail and the angle bars. The tabs 17 of the washer 15 are now engaged with the grooves 13 of the bolt and the washer is slipped longitudinally on the bolt until the flat sides thereof engage with the flanges 20 of the angle bar 21. The nut 22 is now screwed over the bolt in the usual way, and after being drawn up tightly into place, the portion of the thread of the nut lying in one of the grooves is distorted by means of a punch or other suitable tool placed in the groove, thus forming a distorted thread portion 23 as shown in Figs. 3 and 4 which locks the nut in position. The nut is thus securely locked in place, but the locking means is such that the nut may be removed from the bolt by means of a wrench without mutilating the threads of the bolt. The tabs 17 of the washer are arranged on a center line which is at right angles to two opposite sides of the washer so that, when assembling, it is possible to so place the bolt that the groove 13 will be arranged on the horizontal axis, whereby water will be prevented from accumulating therein.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A track bolt having a body formed with screw-threads and with a plurality of longitudinal grooves, a relatively thick, unbendable washer provided with an opening for free passage over the body of the bolt and provided with inwardly projecting tabs for engagement with the grooves of the bolt, and a nut mounted upon the bolt and provided with a distorted thread portion disposed in one of the grooves when set in position.

2. The combination with a rail and the splice bar thereon, of a track bolt comprising a body having a head at one end and a screw-threaded portion at the other end, the screw-threaded portion having longitudinal grooves formed therein, a relatively thick, unbendable washer provided with an opening and inwardly projecting tabs for engagement with the grooves of the bolt, the perimeter of the washer being polygonal and engageable with the flanges of the splice bar, whereby the washer will be prevented from rotating, a nut engageable with the threads, and a distorted thread portion formed on the nut and disposed in one of the grooves when the nut is set in position.

3. The combination with a rail and the splice bar thereon, of a track bolt comprising a body having a head at one end and a screw-threaded portion at the other end, the screw-threaded portion having longitudinal grooves formed therein, a relatively thick, unbendable washer provided with an opening and inwardly projecting tabs for engagement with the grooves of the bolt, the perimeter of the washer being so formed that relative rotation with the splice bar will be prevented, and a nut engageable with the threads and formed with a distorted thread portion opposite one of the grooves of the bolt when screwed into position.

In testimony whereof, I have hereunto signed my name.

MARSHALL LAPHAM.